US006752010B2

(12) United States Patent
Gokan et al.

(10) Patent No.: US 6,752,010 B2
(45) Date of Patent: Jun. 22, 2004

(54) SENSOR ARRANGEMENT STRUCTURE FOR PERSONAL WATERCRAFT

(75) Inventors: Yoshitsugu Gokan, Saitama (JP); Kazuhito Hotta, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 42 days.

(21) Appl. No.: 10/188,918

(22) Filed: Jul. 5, 2002

(65) Prior Publication Data

US 2003/0019287 A1 Jan. 30, 2003

(30) Foreign Application Priority Data

Jul. 13, 2001 (JP) ....................................... 2001-213495

(51) Int. Cl.[7] ............................................... G01M 15/00
(52) U.S. Cl. ...................................... 73/118.2; 73/118.1
(58) Field of Search ................................ 73/116, 117.2, 73/117.3, 118.1, 118.2, 119 R; 340/438, 439; 701/101

(56) References Cited

U.S. PATENT DOCUMENTS 5,606,952 A * 3/1997 Kanno et al. .......... 123/406.74
5,615,645 A * 4/1997 Kanno ...................... 123/73 C
5,775,311 A * 7/1998 Kato et al. .................. 123/681
5,788,547 A * 8/1998 Ozawa et al. ............. 440/89 R
5,902,158 A * 5/1999 Nakase et al. ............ 440/88 R
5,902,161 A * 5/1999 Nakase ..................... 440/88 R
6,024,068 A * 2/2000 Nakase et al. .......... 123/198 D
6,474,298 B2 * 11/2002 Kanno .................... 123/339.14
2001/0001955 A1 * 5/2001 Kanno ........................ 123/327
2001/0032498 A1 * 10/2001 Fujino et al. ................. 73/116
2002/0009933 A1 * 1/2002 Nakase et al. ................ 440/88
2002/0023627 A1 * 2/2002 Nakase et al. .............. 123/516
2003/0017765 A1 * 1/2003 Gokan et al. ................. 440/88

FOREIGN PATENT DOCUMENTS

JP 10-318014 A 12/1998

* cited by examiner

*Primary Examiner*—Eric S. McCall
(74) *Attorney, Agent, or Firm*—Birch, Stewart, Kolasch & Birch, LLP

(57) ABSTRACT

A sensor arrangement structure for an engine for a personal watercraft for preventing an engine controlling sensor from being splashed with water so that the engine operates appropriately. An engine for driving a jet propulsion pump is provided in a watercraft body surrounded by a hull and a deck with a throttle body and a surge tank contiguous to the throttle body being provided on the intake side of the engine and forming a horizontal partition assembly A extending in a forward and rearward direction and extending in a substantially horizontal direction at an upper portion of the engine. A sensor for controlling the engine is disposed above the horizontal partition assembly. An intercooler is disposed just below the surge tank. The intake pressure sensor for detecting the intake pressure on the downstream side with respect to the throttle valve is disposed adjacent to a head cover and is attached in a state wherein it is spaced away from an upper face of the throttle body.

10 Claims, 5 Drawing Sheets

SENSOR ARRANGEMENT STRUCTURE FOR PERSONAL WATERCRAFT

CROSS-REFERENCE TO RELATED APPLICATIONS

The present application claims priority under 35 USC 119 to Japanese Patent Application No. 2001-213495 filed on Jul. 13, 2001 the entire contents thereof is hereby incorporated by reference.

BACKGROUND OF THE INVENTION

1. Field of the Invention

This invention relates to a sensor arrangement structure for an engine for a personal watercraft.

2. Description of Background Art

Conventionally, a personal watercraft is known wherein an engine for driving a jet propulsion pump is provided in a watercraft body surrounded by a hull and a deck.

In a personal watercraft of the type described, an intake duct for supplying air into the watercraft body is provided. From an opening of the intake duct on the inner side of the watercraft body, water is sometimes admitted in the form of droplets into the watercraft body together with air. If an engine controlling sensor is exposed to the water, then there is the possibility that a wrong signal may be inputted from the sensor to a control apparatus for the engine to cause the engine to operate inappropriately.

In order to eliminate such a disadvantage as just described, a personal watercraft has been proposed wherein an engine controlling sensor is disposed above an opening of an intake duct on the inner side of a watercraft body as disclosed in Japanese Patent Laid-Open No. Hei 10-318014.

With the personal watercraft described above, since the engine controlling sensor is provided above the opening of the intake duct on the inner side of the watercraft body, even if water is introduced in the form of droplets into the space in the watercraft body when the atmospheric air outside the watercraft body is introduced into the space in the watercraft body through the intake duct during operation of the personal watercraft, the water is less likely to splash the sensor, and the engine is likely to operate appropriately.

Since usually a personal watercraft of the type described is frequently utilized for leisure, such a situation where some water enters the inside of the watercraft body occurs frequently.

Further, a personal watercraft frequently undergoes sudden turns or violent rolling because it is in most cases utilized for leisure.

In such a situation as just described, in the conventional personal watercraft described above, since the engine controlling sensor is merely disposed above the opening of the intake duct on the inner side of the watercraft body, if the personal watercraft turns suddenly or rolls violently in a state wherein some water is admitted in the watercraft body, then the water in the watercraft body is likely to splash the engine controlling sensor. Therefore, the conventional personal watercraft described above still has the possibility that the engine may be hindered from operating appropriately.

In other words, the prior art described above does not present a sufficient countermeasure for prevention of the engine controlling sensor from being splashed with water.

SUMMARY AND OBJECTS OF THE INVENTION

The object of the present invention resides in a solution of such a problem as described above and the provision of a sensor arrangement structure for an engine for a personal watercraft which takes a sufficient countermeasure for prevention of an engine controlling sensor from being splashed with water so that the engine operates appropriately.

In order to attain the object described above, a sensor arrangement structure for an engine of a personal watercraft for driving a jet propulsion pump is provided in a watercraft body surrounded by a hull and a deck with a throttle body and a surge tank contiguous to the throttle body being provided on an intake side of the engine. A horizontal partition assembly extends in a forward and rearward direction and extendes in a substantially horizontal direction at an upper portion of the engine formed from the throttle body and the surge tank with a sensor for controlling the engine is disposed above the horizontal partition assembly.

According to the present invention, the sensor arrangement structure for an engine of a personal watercraft is provided with a supercharger which communicates with the surge tank through an intercooler and a supercharged pressure sensor and/or a temperature sensor of air of the supercharger is provided above the surge tank with the intercooler being disposed just below the surge tank.

According to the present invention, the sensor arrangement structure for an engine for a personal watercraft includes an intake pressure sensor for detecting an intake pressure of the throttle body on the downstream side of the throttle that is disposed rather near to a head cover of the engine between the head cover and the surge tank.

According to the present invention, the sensor arrangement structure for an engine for a personal watercraft includes the intake pressure sensor attached to the head cover in such a state that the intake pressure sensor is spaced away from an upper face of the throttle body.

According to the present invention, the sensor arrangement structure for an engine for a personal watercraft includes an opening which is closed with a removable lid member provided in an upper portion of the deck, and the sensor is exposed to the opening.

According to the present invention, a sensor arrangement structure for an engine for a personal watercraft is structured such that an engine for driving a jet propulsion pump is provided in a watercraft body surrounded by a hull and a deck with a throttle body and a surge tank contiguous to the throttle body being provided on an intake side of the engine. A horizontal partition assembly extends in a forward and rearward direction and extends in a substantially horizontal direction at an upper portion of the engine and is formed from the throttle body and the surge tank. A sensor for controlling the engine is disposed above the horizontal partition assembly. Therefore, even if the personal watercraft turns suddenly or rolls violently in a state wherein some water is admitted into the watercraft body and the water in the watercraft body moves toward the sensor, the water is in most cases hindered by the horizontal partition assembly formed from the throttle body and the surge tank in such a state that it extends in a forward and rearward direction and extends in a substantially horizontal direction above the engine, and is less likely to splash the sensor.

Accordingly, such a situation wherein the sensor for controlling the engine becomes wet with water is less likely to occur. Thus, a situation wherein a wrong signal is inputted from the sensor to a control apparatus for the engine is less likely to occur. Therefore the engine is likely to operate appropriately.

According to the present invention, the sensor arrangement structure for an engine for a personal watercraft according to the present invention is structured such that the engine is provided with a supercharger which communicates with the surge tank through an intercooler and a supercharged pressure sensor and/or a temperature sensor of air of the supercharger is provided above the surge tank with the intercooler being disposed just below the surge tank. Therefore, even if the water in the watercraft body is excited and tends to move toward the sensor, it is hindered also by the intercooler disposed just below the surge tank and is less likely to splash the supercharged pressure sensor and/or the temperature sensor.

Accordingly, a situation wherein the sensor for controlling the engine with a supercharger becomes wet with water is less likely to occur. Thus, a situation wherein a wrong signal is inputted from the sensor to the control apparatus for the engine with a supercharger is less likely to occur. Therefore, the engine with a supercharger is likely to operate appropriately.

According to the present invention, the sensor arrangement structure for an engine for a personal watercraft includes an intake pressure sensor for detecting an intake pressure of the throttle body on the downstream side of the throttle valve that is disposed rather near to a head cover of the engine between the head cover and the surge tank. Therefore, the intake pressure sensor is disposed at a high position at substantially the center in the widthwise direction of the watercraft body.

Accordingly, even if the water in the watercraft body is excited and tends to move toward the intake pressure sensor, such a situation wherein the intake pressure sensor becomes wet with water is less likely to occur. Thus, a situation wherein a wrong signal from the intake pressure sensor is inputted to the control apparatus for the engine is less likely to occur. Therefore the engine is likely to operate appropriately.

According to the present invention, the sensor arrangement structure for an engine for a personal watercraft includes the intake pressure sensor attached to the head cover wherein the intake pressure sensor is spaced away from an upper face of the throttle body. Therefore, even if the intake pressure sensor should be splashed with water or some water should stay on the upper face of the throttle body, the water is retracted (removed) rapidly from around the intake pressure sensor.

Accordingly, even if the intake pressure sensor becomes wet with water, this state is eliminated in a short time, and a situation wherein there is the possibility that a wrong signal may be inputted from the intake pressure sensor to the control apparatus for the engine is likely to be eliminated in a short time, and the engine is likely to operate appropriately.

Further, since the intake pressure sensor is attached to the head cover, the intake pressure sensor can be attached readily in a state wherein it is accurately spaced away from the upper face of the throttle body.

According to the present invention, the sensor arrangement structure for an engine for a personal watercraft includes an opening that is closed with a removable lid member provided in an upper portion of the deck, and the sensor is exposed to the opening. Therefore, if the lid member is opened, then a checking operation of the sensor can be performed readily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention is described with reference to the drawings.

Figure 1:
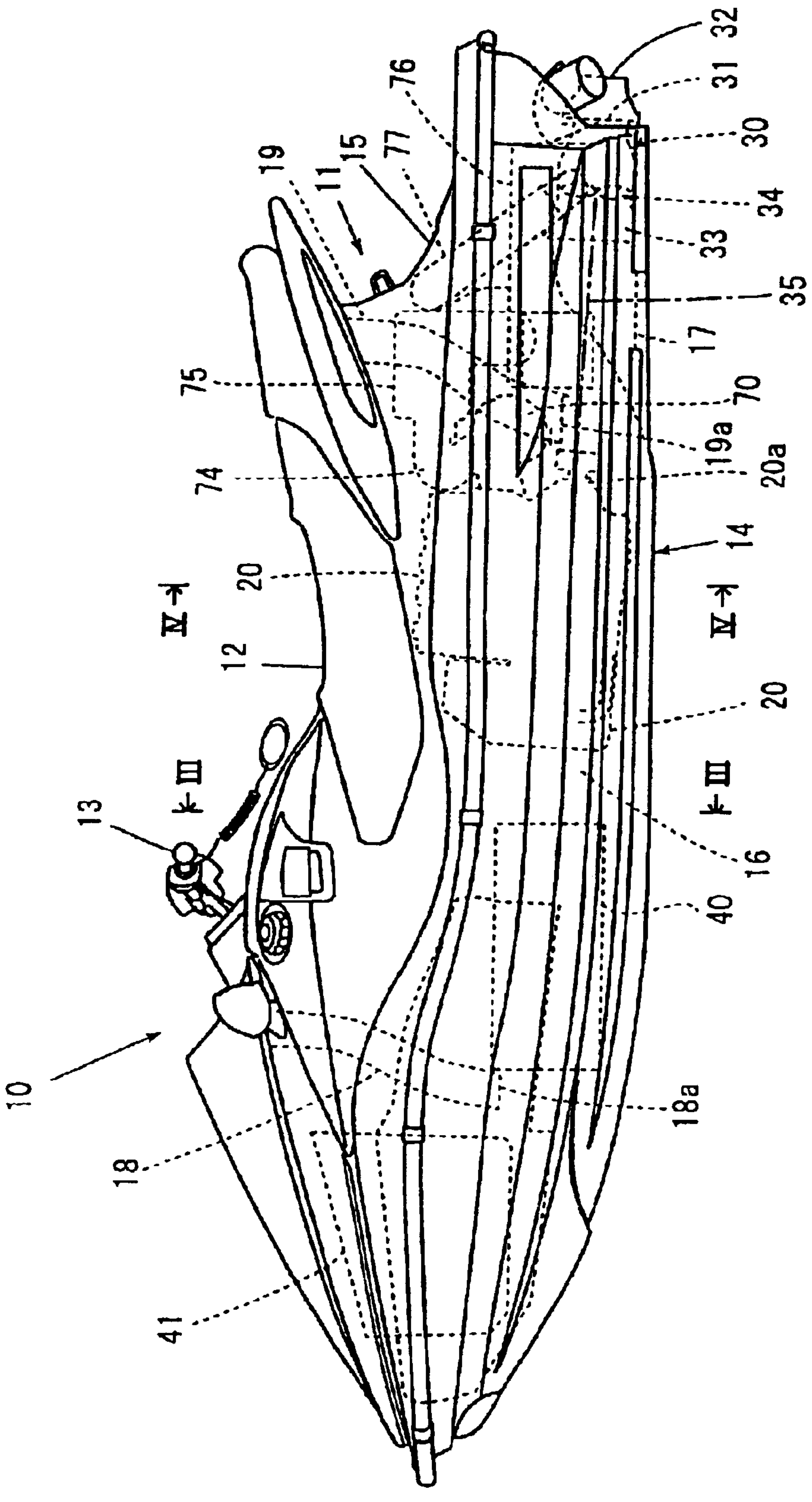
FIG. 1 is a schematic side elevational view showing an embodiment of a personal watercraft in which an embodiment of a sensor arrangement structure for a personal watercraft according to the present invention is employed.

As shown in the FIG. 1, a personal watercraft 10 is a small watercraft of the saddle type wherein a driver can sit on a seat 12 on a watercraft body 11 and grip a steering handle 13 with a throttle level to steer the personal watercraft 10.

The watercraft body 11 has a floating body structure wherein a hull 14 and a deck 15 are joined together such that a space 16 is formed in the inside thereof. In the space 16, an engine 20 is mounted on the hull 14, and a jet pump (et propulsion pump) 30 as propulsion means which is driven by the engine 20 is provided at a rear portion of the hull 14.

An intake duct 18, 19 for supplying intake air into the watercraft body (space 16) is provided on the watercraft body 11.

The jet pump 30 has a passage 33 extending from an intake 17 open to the watercraft bottom to a jet outlet 31 and a nozzle 32 open to the rear end of the watercraft body and an impeller 34 disposed in the passage 33 with a shaft 35 of the impeller 34 connected to an output power shaft 20*a* of the engine 20. Accordingly, if the impeller 34 is driven to rotate by the engine 20, then water taken in from the intake 17 is jetted from the nozzle 32 through the jet outlet 31 so that the watercraft body 11 is propelled. The driving speed of the engine 20, that is, the propelling force by the jet pump 30, is operated by a turning operation of a throttle lever 13*a* (refer to FIG. 2) of the steering handle 13 described above. The nozzle 32 is operatively associated with the steering handle 13 by an operation wire not shown such that it is pivoted by an operation of the steering handle 13, and the advancing direction can be changed thereby.

A fuel tank 40 and an accommodation chamber 41 are provided in the space 16.

Figure 4:
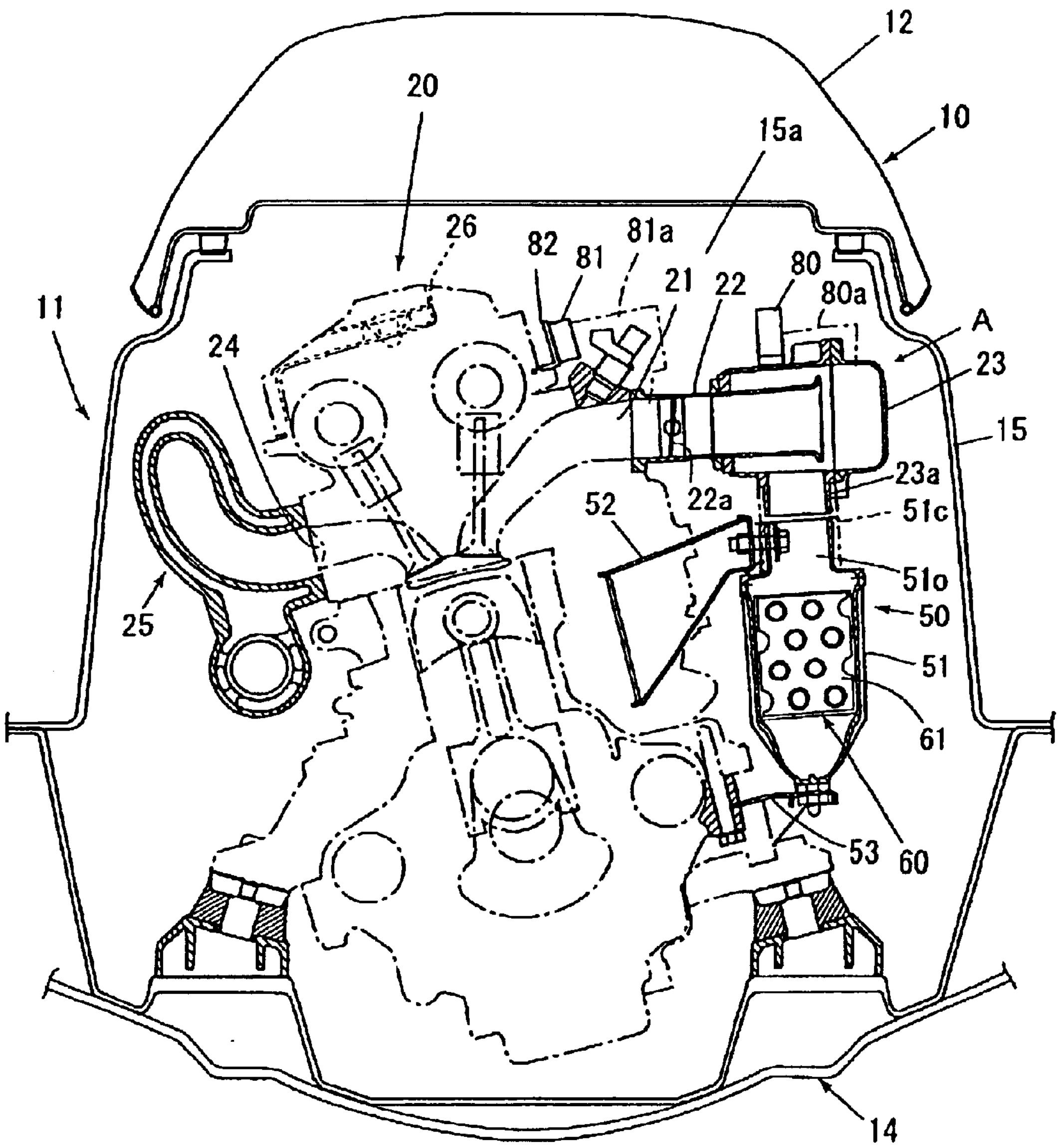
FIG. 4 is a view principally showing an engine 20 and is a partial enlarged sectional view (partly omitted sectional view) taken along line IV—IV of FIG. 1.
Figure 5:
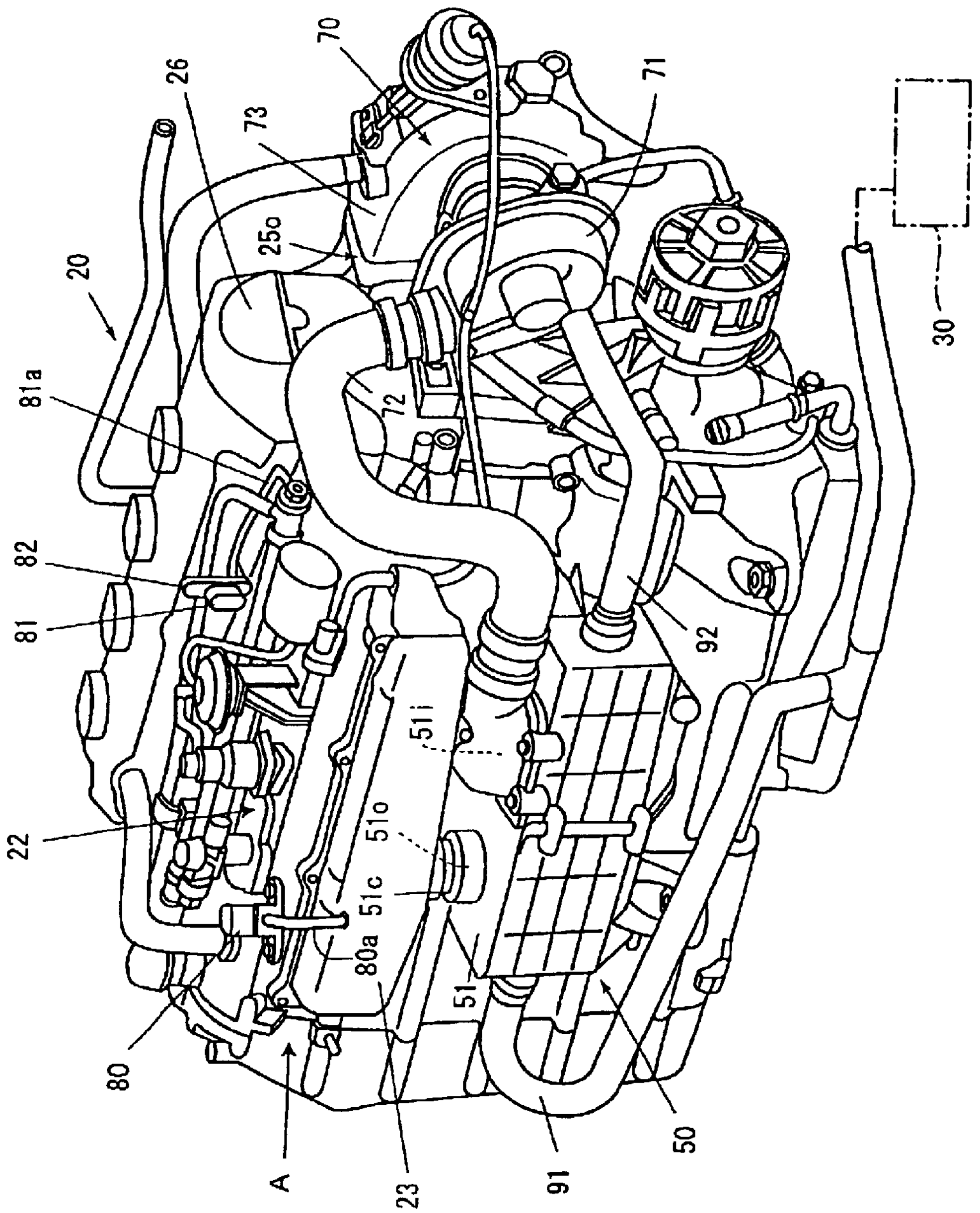
FIG. 5 is a schematic perspective view of the engine 20 as viewed obliquely from the rear.

As illustrated in FIGS. 4 and 5, the engine 20 is a DOHC in-line 4-cylinder 4-cycle engine wherein a crankshaft (refer to the output power shaft 20*a*) thereof extends in the forward and rearward direction of the body 11 as shown in FIG. 1. Further, as can be seen from FIG. 4, the engine 20 is carried on the watercraft body 11 in a state wherein a vertical axis (center axis) thereof is inclined in the counterclockwise direction as viewed in front elevation (FIG. 4).

As shown in FIG. 4, an intake opening (intake port) 21 is disposed on the left side of the engine 20 with respect to the advancing direction of the watercraft body 11, and an exhaust opening (exhaust port) 24 is disposed on the right side of the engine 20. Four such intake openings (intake ports) 21 and four such exhaust openings (exhaust ports) 24 are disposed along the forward and rearward directions of the engine 20.

A throttle body 22 and a surge tank (intake chamber) 23 which communicate with the intake opening 21 are connected to the intake opening 21. The throttle body 22 and the surge tank 23 form a horizontal partition assembly A which extends in the forward and rearward direction (refer to FIG. 5) and extends in a substantially horizontal direction at an upper portion of the engine 20.

An intercooler 50 is connected to and disposed just below the surge tank 23. Mounting brackets 52 and 53 are provided for mounting the intercooler 50 on the engine 20.

As shown in FIGS. 4 and 5, the intercooler 50 includes a case 51 having an intake entrance 51*i* connected for communication by a pipe 72 to a compressor section 71 of a supercharger (turbocharger) 70 disposed immediately rearwardly of the engine 20 and an exit 51*o* connected to an intake entrance 23*a* of the surge tank 23 by a tube 51*c*, and a cooling unit 60 (refer to FIG. 4) with a perforated cooling member 61 accommodated in the case SI and serving as a heat exchanging unit.

Referring to FIG. 5, cooling water hoses 91 and 92 are connected to the intercooler 50.

Meanwhile, as shown in FIG. 4, an exhaust manifold 25 (refer to FIG. 1) is provided at the exhaust opening 24 of the engine 20 such that it extends in the direction of the arrangement of the exhaust opening 24, that is, in the forward and rearward direction of the engine 20. An exhaust exit 25*o* (refer to FIG. 5) is provided at a rear end of the exhaust manifold 25 that is connected to a turbine portion 73 of the supercharger 70.

Figure 2:
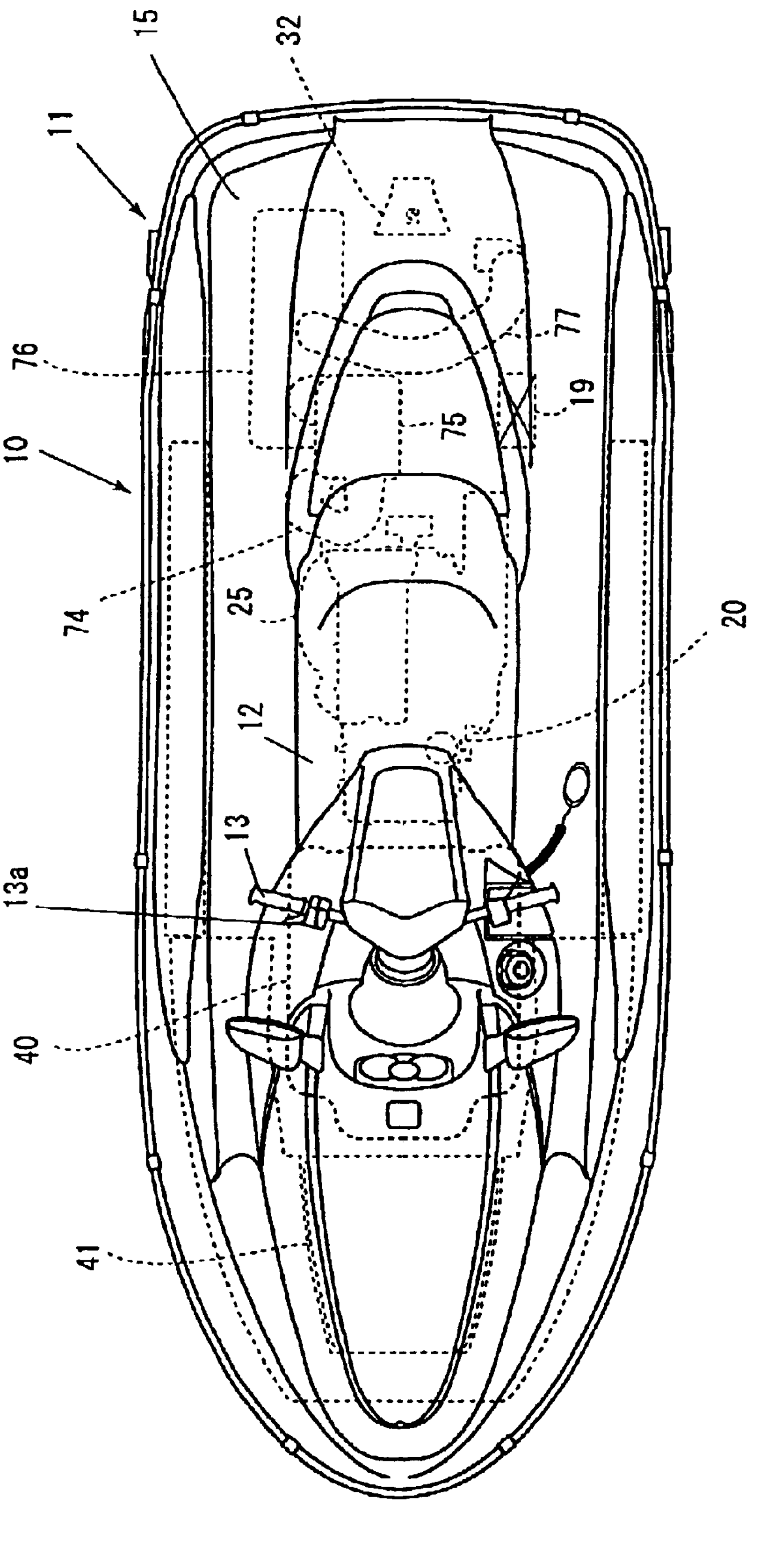
FIG. 2 is a plan view of the same.
Figure 3:
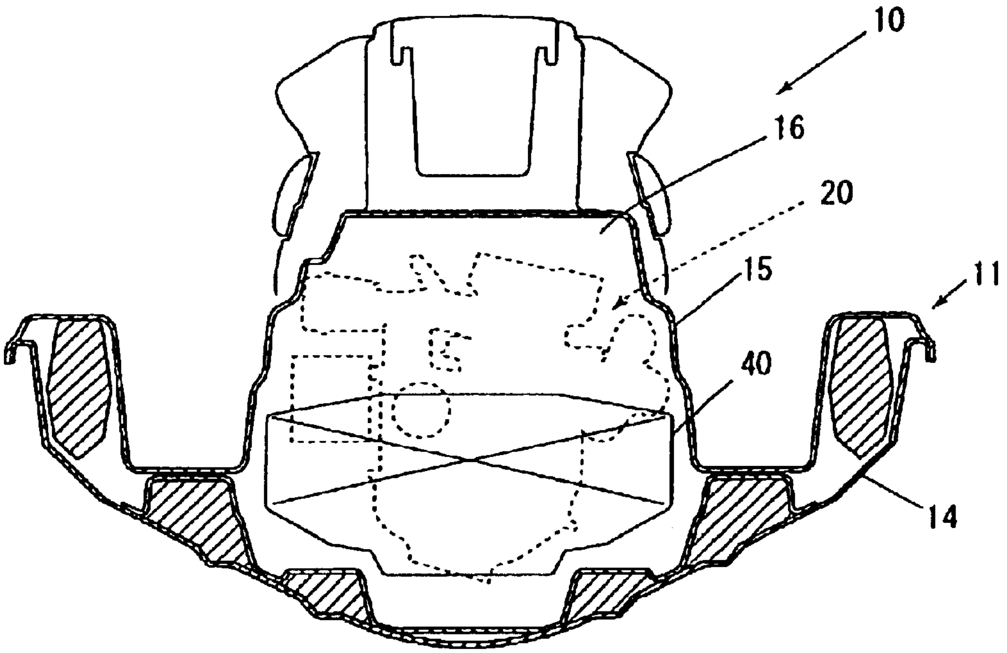
FIG. 3 is a partial enlarged sectional view (partly omitted sectional view) taken along line III—III of FIG. 1.

It is to be noted that exhaust gas having rotated the turbine in the turbine portion 73 passes successively through an exhaust pipe 74, a back flow preventing chamber 75 for preventing backflow of water upon upsetting (admission of water into the supercharger 70 and so forth), a water muffler 76 and an exhaust-drainage pipe 77 and is discharged into a water stream formed by the jet pump 30 as seen in FIGS. 1 and 2.

As shown in FIGS. 4 and 5, a sensor 80 for air supplied from the supercharger 70 through the intercooler 50 is provided at an upper portion of the surge tank 23, at an upper portion of the horizontal partition assembly A. The sensor 80 is disposed above the throttle body 22, above the horizontal partition assembly A, as can be seen from FIGS. 4 and 5. The sensor 80 is in communication with the inside of the surge tank 23 by a pipe 80*a* and is electrically connected to an engine control circuit (not shown). The sensor 80 may be formed as a supercharged pressure sensor for detecting the pressure of air (supercharged pressure) in the surge tank 23 or may alternatively be formed as a temperature sensor for detecting the temperature of air in the surge tank 23. The sensor 80 may otherwise be formed as a supercharged pressure and temperature sensor which detects not only the pressure of air (supercharged pressure) in the surge tank 23 but also the temperature of the air. Further, while a single sensor 80 is shown in the figures, it is possible to provide a supercharged pressure sensor for detecting the pressure of air (supercharged pressure) in the surge tank 23 and a temperature sensor for detecting the temperature of air in the surge tank 23 separately from each other (i.e., to provide two sensors) at an upper portion of the surge tank 23.

An intake pressure sensor 81 for detecting the intake pressure on the downstream side with respect to a throttle (throttle valve) 22*a* in the throttle body 22 is disposed rather near to a head cover 26 of the engine 20 between the head cover 26 and the surge tank 23. The sensor 81 is attached to the head cover 26 by a mounting member 82 and is disposed above the throttle body 22, above the horizontal partition assembly A, as can be seen from FIGS. 4 and 5. Further, the intake pressure sensor 81 is attached by the mounting member 82 in a state wherein it is spaced away from an upper face of the throttle body 22. The sensor 81 is in communication with the inside of an intake path on the downstream side with respect to the throttle valve 22*a* of the throttle body 22 by a pipe 81*a* and is electrically connected to the engine control circuit (not shown).

Such engine controlling sensors 80 and 81 as described above are provided at positions higher than the watercraft body inside openings 18*a* and 19*a* of the intake ducts 18 and 19 as can be seen from FIG. 1.

Further, an opening 15*a* is provided at an upper portion of the deck 15 as shown in FIG. 4, and the sensors 80 and 81 are exposed to the opening 15*a*. The opening 15*a* of the deck 15 is opened by removing the seat 12 serving as a lid member removably mounted on the watercraft body 11 from the watercraft body 11.

With the sensor arrangement structure for an engine for a personal watercraft having such a configuration as described above, the following operation and effects are achieved.

The sensor arrangement structure for an engine for a personal watercraft is structured such that an engine 20 for driving a jet propulsion pump 30 is provided in a watercraft body 11 surrounded by a hull 14 and a deck 15. A throttle body 22 and a surge tank 23 contiguous to the throttle body 22 are provided on an intake side of the engine 20. A horizontal partition assembly A extending in a forward and rearward direction and extending in a substantially horizontal direction at an upper portion of the engine 20 is formed from the throttle body 22 and the surge tank 23. Sensors 80, 81, for controlling the engine, are disposed above the horizontal partition assembly A. Therefore, even if the personal watercraft 10 turns suddenly or rolls violently in a state wherein some water is admitted in the watercraft body 11 and the water in the watercraft body 11 is excited and tends to move toward the sensors 80, 81, the water is in most cases hindered by the horizontal partition assembly A formed from the throttle body 22 and the surge tank 23 in such a state that it extends in a forward and rearward direction and extends in a substantially horizontal direction above the engine 20, and is less likely to splash the sensors 80, 81.

Accordingly, a situation wherein the sensors 80, 81 for controlling the engine become wet with water is less likely to occur, and a situation wherein a wrong signal is inputted from the sensors 80, 81 to a control apparatus for the engine is less likely to occur. Therefore the engine 20 is likely to operate appropriately.

The engine 20 is provided with a supercharger 70 which communicates with the surge tank 23 through an intercooler 50 and a supercharged pressure sensor (and/or a temperature sensor) 80 of air of the supercharger 70 is provided above the surge tank 23, and the intercooler 50 is disposed just below the surge tank 23. Therefore, even if the water in the watercraft body 11 is excited and tends to move toward the sensor 80, it is hindered also by the intercooler 50 disposed just below the surge tank 23 and is less likely to splash the supercharged pressure sensor (and/or a temperature sensor) 80.

Accordingly, a situation wherein the sensor 80 for controlling the engine with a supercharger becomes wet with water is less likely to occur, and such a situation wherein a wrong signal is inputted from the sensor 80 to the control apparatus for the engine with a supercharger is less likely to occur. Therefore the engine with a supercharger is likely to operate appropriately.

An intake pressure sensor 81 for detecting an intake pressure of the throttle body 22 on the downstream side of the throttle valve 22*a* is disposed rather near to a head cover 26 of the engine 20 between the head cover 26 and the surge tank 23. Therefore, the intake pressure sensor 81 is disposed at a high position at substantially the center in the widthwise direction of the watercraft body.

Accordingly, even if the water in the watercraft body 11 is excited and tends to move toward the intake pressure sensor 81, such a situation wherein the intake pressure sensor 81 becomes wet with water is less likely to occur, and such a situation wherein a wrong signal from the intake pressure sensor 81 is inputted to the control apparatus for the engine 20 is less likely to occur. Therefore the engine 20 is likely to operate appropriately.

More particularly, a personal watercraft of the type described is utilized principally for leisure, it turns quickly or rolls over a great amount (rocks in the clockwise direction or the counterclockwise direction in FIG. 4) or may be upset in an extreme case. Also in such an instance, with the sensor arrangement structure of the present embodiment, since water admitted in the watercraft body 11 is less likely to splash the sensor 80, 81, particularly the intake pressure sensor 81 disposed at a high position at substantially the center in the widthwise direction of the watercraft body, appropriate operation of the engine 20 can be achieved.

The intake pressure sensor 81 is attached to the head cover 26 in such a state wherein the intake pressure sensor 81 is spaced away from an upper face of the throttle body 22. Therefore, even if the intake pressure sensor 81 is splashed with water or some water should stay on the upper face of the throttle body 22, the water is retracted (removed) rapidly from around the intake pressure sensor 81.

Accordingly, even if the intake pressure sensor 81 should become wet with water, this state is eliminated in a short time, and a situation wherein there is the possibility that a wrong signal may be inputted from the intake pressure sensor 81 to the control apparatus for the engine is likely to be eliminated in a short time, and the engine 20 is likely to operate appropriately.

Further, since the intake pressure sensor 81 is attached to the head cover 26, the intake pressure sensor 81 can be attached readily in a state wherein it is accurately spaced away from the upper face of the throttle body 22.

An opening 15*a* which is closed with an openable and closeable lid member 12 is provided in an upper portion of the deck 15, and the sensor 80, 81 is exposed to the opening 15*a*. Therefore, if the lid member 12 is opened, then a checking operation of the sensor 80, 81 and an upper portion of the engine 20 can be readily performed.

Since an intake duct 18, 19 for supplying intake air into the watercraft body 11 is provided on the watercraft body 11 and the sensors 80, 81 are provided at a position higher than a watercraft body inner side opening 18*a*, 19*a* of the intake duct 18, 19, when the atmospheric air outside the watercraft body 11 is introduced into the space 16 in the watercraft body 11 through the intake duct 18, 19 during operation of the personal watercraft 10, even if it is introduced in together with water (for example, in the form of droplets), such a situation wherein the water splashes the sensor 80, 81 is less likely to occur.

Accordingly, a situation wherein the sensors 80, 81 for controlling the engine become wet with water is further less likely to occur, and such a situation wherein a wrong signal is inputted from the sensors 80, 81 to the control apparatus for the engine 20 is further less likely to occur. Therefore the engine 20 operates further appropriately.

While embodiments of the present invention are described above, the present invention is not limited to the embodiments described above but can be carried out suitably in various forms within the scope of the subject matter of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sensor arrangement structure for an engine for a personal watercraft comprising:

- an engine for driving a jet propulsion pump, said engine being mounted in a watercraft body surrounded by a hull and a deck;
- a throttle body and a surge tank contiguous to said throttle body, said throttle body and surge tank being provided on an intake side of said engine;
- a horizontal partition assembly extending in a forward and rearward direction and extending in a substantially horizontal direction at an upper portion of said engine, said horizontal partition assembly being formed from said throttle body and said surge tank; and
- a sensor for controlling said engine being disposed above said horizontal partition assembly; wherein said engine is provided with a supercharger for communicating with said surge tank through an intercooler and a supercharged pressure sensor and/or a temperature sensor of air of said supercharger is provided above said surge tank, and said intercooler is disposed just below said surge tank.

2. The sensor arrangement structure for an engine for a personal watercraft according to claim 1, wherein an intake pressure sensor for detecting an intake pressure of said throttle body on the downstream side of the throttle valve is disposed adjacent to a head cover of said engine between said head cover and said surge tank.

3. The sensor arrangement structure for an engine for a personal watercraft according to claim 2, wherein said intake pressure sensor is attached to said head cover wherein said intake pressure sensor is spaced away from an upper face of said throttle body.

4. The sensor arrangement structure for an engine for a personal watercraft according to claim 1, wherein an opening is provided in an upper portion of said deck, said opening being selectively closed with a removable lid member, and said sensor is exposed to said opening.

5. The sensor arrangement structure for an engine for a personal watercraft according to claim 1, wherein an opening is provided in an upper portion of said deck, said opening being selectively closed with a removable lid member, and said sensor is exposed to said opening.

6. A sensor arrangement structure for an engine for a personal watercraft comprising:

an engine for driving a jet propulsion pump, said engine being mounted in a watercraft body surrounded by a hull and a deck;

a throttle body and a surge tank contiguous to said throttle body, said throttle body and surge tank being provided on an intake side of said engine;

a partition assembly extending in a forward and rearward direction at an upper portion of said engine, said partition assembly being formed from said throttle body and said surge tank; and a sensor for controlling said engine being disposed above said horizontal partition assembly wherein said partition assembly provides a shield for said sensor;

wherein said engine is provided with a supercharger for communicating with said surge tank through an intercooler and a supercharged pressure sensor and/or a temperature sensor of air of said supercharger is provided above said surge tank, and said intercooler is disposed just below said surge tank.

7. The sensor arrangement structure for an engine for a personal watercraft according to claim 6, wherein an intake pressure sensor for detecting an intake pressure of said throttle body on the downstream side of the throttle valve is disposed adjacent to a head cover of said engine between said head cover and said surge tank.

8. The sensor arrangement structure for an engine for a personal watercraft according to claim 7, wherein said intake pressure sensor is attached to said head cover wherein said intake pressure sensor is spaced away from an upper face of said throttle body.

9. The sensor arrangement structure for an engine for a personal watercraft according to claim 6, wherein an opening is provided in an upper portion of said deck, said opening being selectively closed with a removable lid member, and said sensor is exposed to said opening.

10. The sensor arrangement structure for an engine for a personal watercraft according to claim 6, wherein an opening is provided in an upper portion of said deck, said opening being selectively closed with a removable lid member, and said sensor is exposed to said opening.

* * * * *